United States Patent [19]
King, Jr.

[11] 3,860,020
[45] Jan. 14, 1975

[54] TRAY CART WASHER
[76] Inventor: Milton H. King, Jr., 382 Wailupe Cir., Honolulu, Hawaii 96821
[22] Filed: July 9, 1973
[21] Appl. No.: 377,457

[52] U.S. Cl............. 134/111, 134/123, 134/168 R, 134/176
[51] Int. Cl........................... B08b 3/02, B08b 9/08
[58] Field of Search............ 134/45, 111, 123, 143, 134/166 R, 167 R, 168 R, 169, 171, 176

[56] References Cited
UNITED STATES PATENTS

| | | | |
|---|---|---|---|
| 1,625,300 | 4/1927 | Davis | 134/171 |
| 3,096,775 | 7/1963 | Clarke et al. | 134/123 |
| 3,291,144 | 12/1966 | Diamond | 134/111 X |

FOREIGN PATENTS OR APPLICATIONS

| | | | |
|---|---|---|---|
| 16,654 | 6/1929 | Australia | 134/176 |
| 1,262,887 | 4/1961 | France | 134/143 |
| 452,545 | 8/1936 | Great Britain | 134/166 R |
| 935,821 | 9/1963 | Great Britain | 134/176 |
| 680,892 | 1/1965 | Italy | 134/143 |

*Primary Examiner*—Daniel Blum
*Attorney, Agent, or Firm*—Lee R. Schermerhorn

[57] ABSTRACT

An enclosed wash chamber has an open top inclined at 45° and extending down substantially to the floor level. A tray cart used for carrying food trays on airlines may be wheeled to the wash chamber and then tilted over on the open top with its door opened 180° so that the open side of the tray cart covers half the open top of the wash chamber and the door of the cart covers the other half. Revolving wash and rinse sprays in the wash chamber wash and rinse the inside of the cart and the inside of the door with the water draining down into the wash chamber. A foot pedal operated clamp bar grips the top of the cart and the top of the door to hold the cart and door securely in washing position.

8 Claims, 5 Drawing Figures

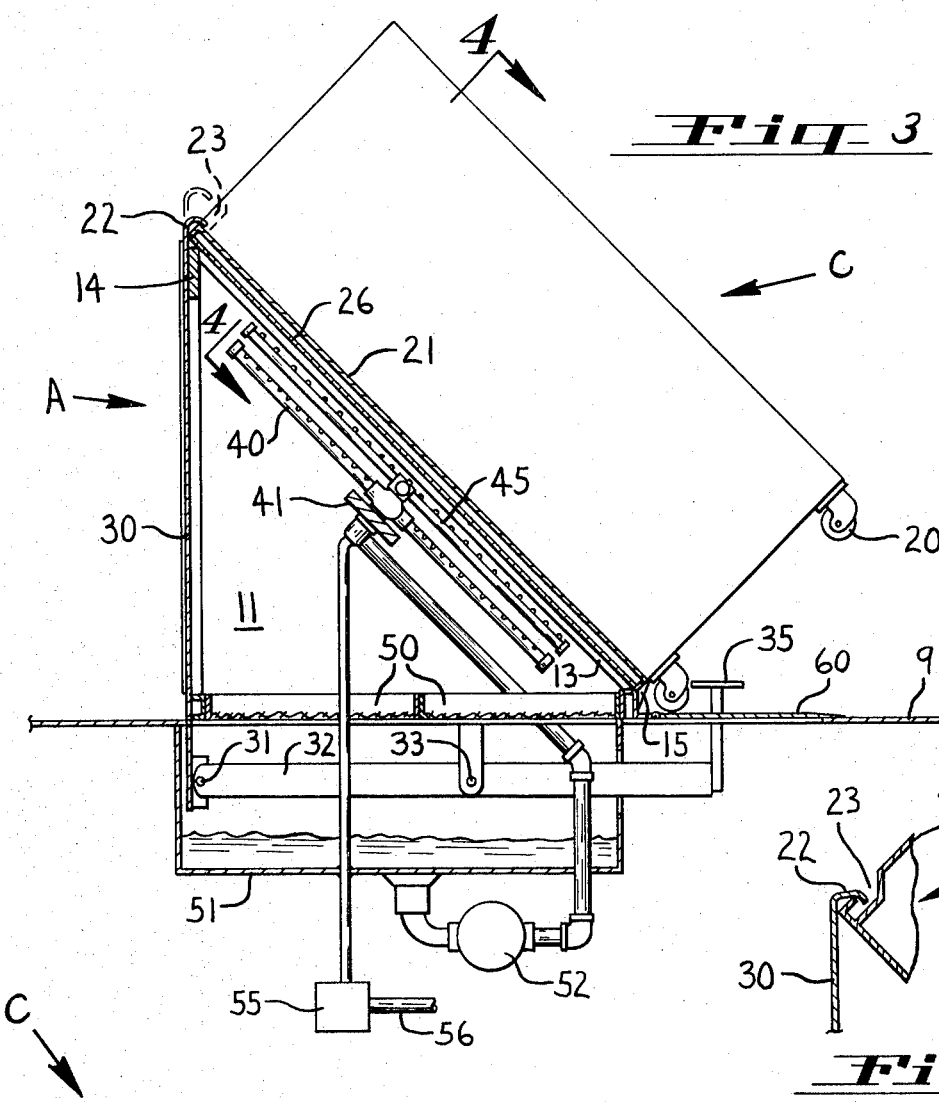
Fig. 3
Fig. 5
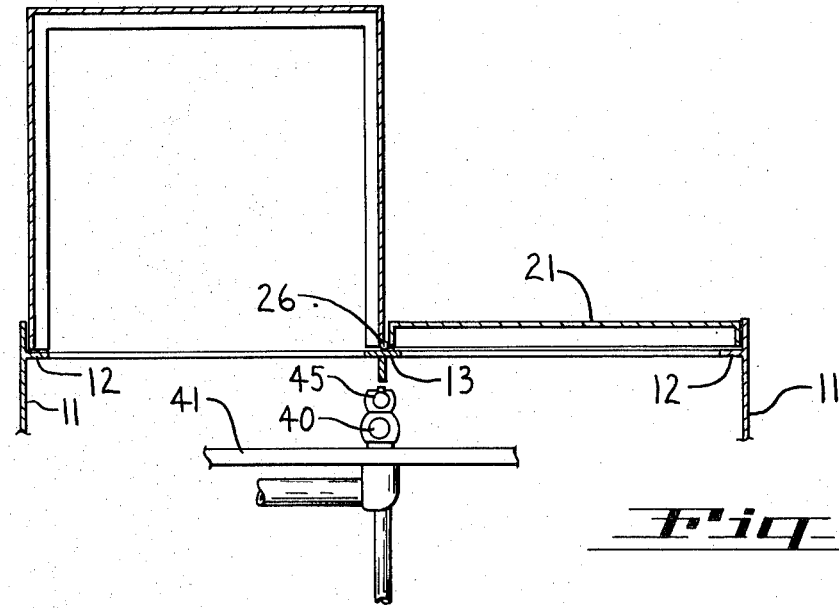
Fig. 4

3,860,020

TRAY CART WASHER

BACKGROUND OF THE INVENTION

This invention relates to a device for washing the tray carts used for carrying trays of food on the airlines.

The great number of such tray carts in current use makes hand washing uneconomical, adding considerably to the cost of the meal service provided. Up to the present time there has been no suitable tray cart washing device which offers an economic advantage over hand washing methods.

Objects of the invention are, therefore, to provide a device for washing tray carts, to provide a device which will wash and rinse the insides of tray carts in a speedy and economical manner with a minimum of manual handling, and to provide a tray cart washer having an inclined open top onto which a tray cart may be tilted for a washing and rinsing operation by mechanical apparatus.

SUMMARY OF THE INVENTION

The present device comprises an enclosed wash chamber containing rotating wash and rinse spray nozzles. The nozzles rotate just under an inclined open top onto which the tray cart may be tilted with its door opened 180° so that the inside of the cart and the inside of the door are exposed to sprays from the washing and rinsing nozzles. The top of the cart and the top of the door are secured by a clamp bar during the wasing operation. The wash water and the rinse water drain back into the washing chamber.

The invention will be better understood and the foregoing and additional objects and advantages will become apparent from the following description of the preferred embodiment illustrated in the accompanying drawings. Various changes may be made, however, in the details of construction and arrangement of parts and certain features may be used without others. All such modifications within the scope of the appended claims are included in the invention.

BRIEF DESCRIPTION OF THE DRAWINGS

FIG. 3 is a view on the line 3—3 in FIG. 2;

FIG. 4 is a view on the line 4—4 in FIG. 3; and

FIG. 5 is a fragmentary sectional view showing the engagement of the clamp bar with the top of the tray cart.

DESCRIPTION OF THE PREFERRED EMBODIMENT

Figure 1:
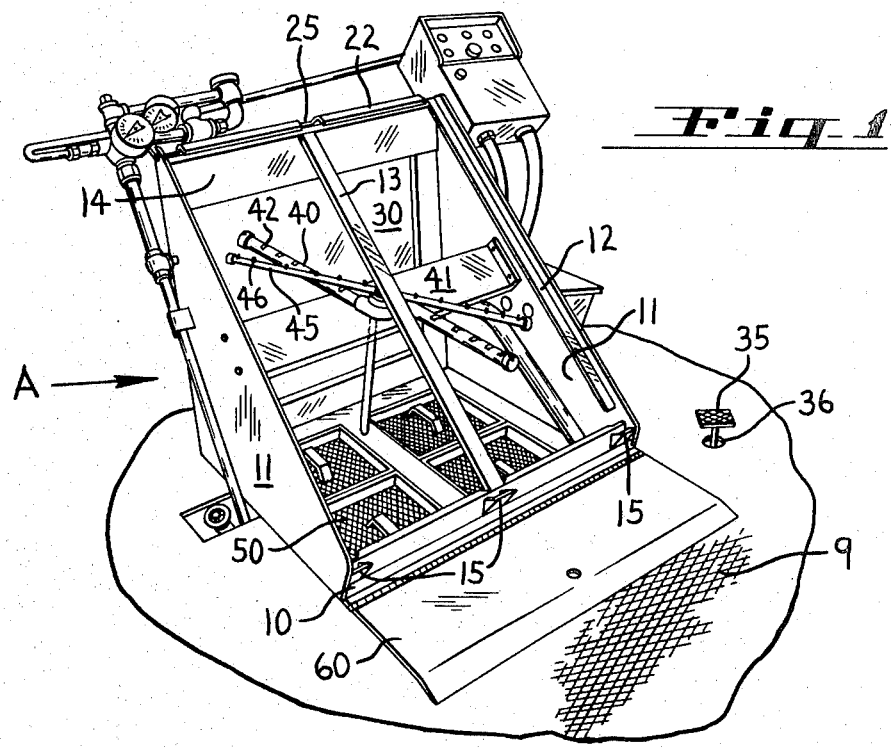
FIG. 1 is a perspective view of a tray cart washer embodying the invention.

The wash chamber A is installed in a steel grating floor 9 which has drainage facilities underneath for cleanliness. The wash chamber comprises a low front wall 10 and a pair of triangular side walls 11 providing an open top inclined at an angle of approximately 45°. Mounted on the inside of each side wall 11 just below its upper edge is a support bar 12. A center support bar 13 is welded at its lower end to front wall 10 and at its upper end to a cross bar 14 which spans the distance between side walls 11, the bar 13 being disposed in the inclined plane of bars 12. Front wall 10 carries three external support brackets 15 aligned with the bars 12 and 13.

Figure 2:
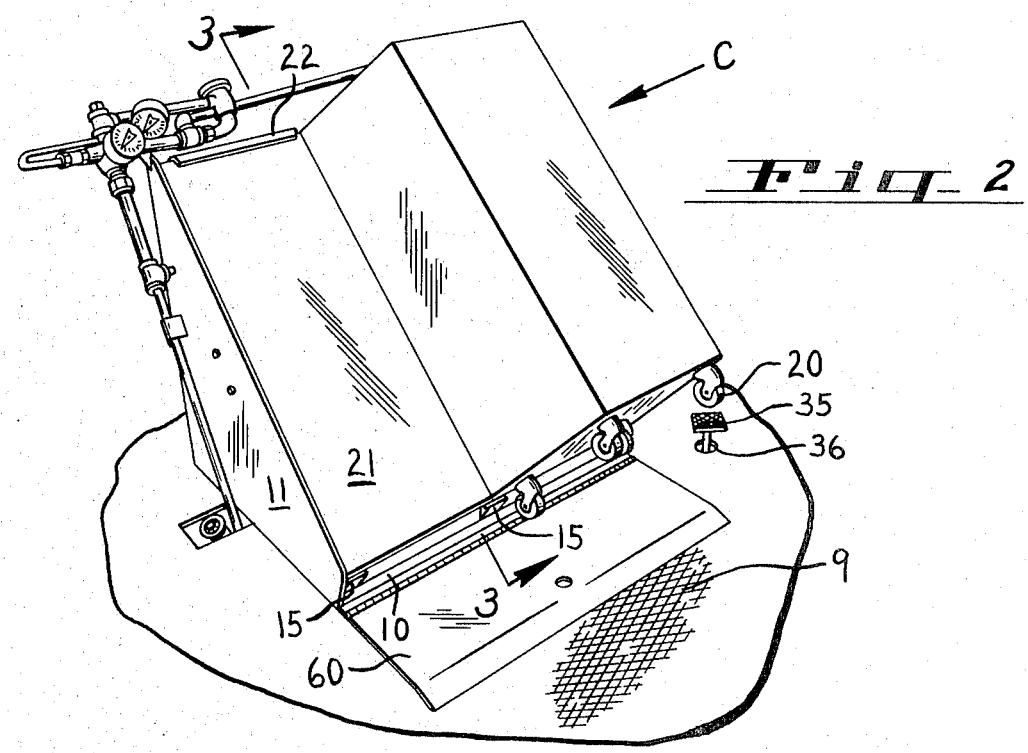
FIG. 2 is a view similar to FIG. 1, showing a tray cart in washing position.

A typical tray cart C containing ledges for food trays is mounted on caster wheels 20 for convenient portabililty. Wheels 20 support the bottom of the cart several inches above floor level and the height of brackets 15 is slightly lower than the bottom of the cart so that the front side of the cart may be wheeled over the brackets 15 and tipped forward on these brackets as fulcrums until the cart rests in inclined position on the bars 12 and 13 as shown in FIG. 2.

Prior to tilting the cart onto the wash chamber, its door 21 is opened 180° as shown. Thus, one side of the cart rests on a bar 12 and the swinging edge of the door rests on the opposite bar 12. The other side of the cart and the hinged edge of the door rest on bar 13 which is wide enough to underlie any crevice between the door and the cart body. One half of the open top of the wash chamber is thereby covered by the cart and the other half is covered by the cart door.

The cart is held securely in washing position by a vertically movable clamp bar 22. As shown in FIGS. 2 and 3, one end of clamp bar 22 hooks over the upper edge of door 21 and, as shown in FIG. 5, the other end of the clamp bar hooks into a hand hold recess 23 which extends along the front edge of top wall 24 of the cart. As shown in FIG. 1, the center of the clamp bar is notched at 25 to span the hinge 26 and adjacent portion of the top wall 24 beyond the end of hand hold recess 23. Clamp bar 22 permits strong streams of water to be projected into the cart and against door 21 without dislodging the cart from its washing position.

Clamp bar 22 is preferably formed as a curved upper edge or flange on a back plate 30 which is slidable vertically in suitable guides on the back edges of side plates 11. The lower end of back plate 30 is pivotally connected at 31 with the back end of a lever arm 32 which is supported on a fulcrum pivot 33 as shown in FIG. 3. The front end of arm 32 is connected to a foot pedal 35 which projects up through a hole 36 in the floor grating 9. Foot pressure on pedal 35 raises back plate 30 and clamp bar 22 to release the cart C from the wash chamber. When a cart has been placed in washing position, the weight of back plate 30 maintains clamping action on the cart and its door 21 by gravity.

Washing action is produced by a pair of tubular spray arms 40 mounted for rotation on a transverse support 41 just under the top opening of the wash chamber. These spray arms have nozzle openings 42 arranged to rotate the spray arms by jet action and project high pressure sprays of hot water and detergent into the inside of cart C and against the inside of its open door 21. A second pair of tubular spray arms 45 is similarly mounted and equipped with nozzles 46 for rotating the arms 45 and spraying the inside of the cart and the inside of its door 21 with rinse water following a washing operation.

Any solid material washed out of the tray carts is collected on removable screen trays 50 above a sump chamber 51 under the floor, which collects the water. The water may be re-used by a pump 52 which supplies the washing spray arms 40. A solenoid valve 55 in a fresh water supply line 56 controls the water supply to rinsing spray arms 45. Sump 51 is also provided with a drain valve, not shown. A hinged floor plate 60 provides access to portions of the plumbing and equipment mounted under the floor.

Conventional equipment similar to that used in dishwashers supplies detergent for the wash water, controls the temperature and pressure of the wash and rinse water and times the duration of washing and rinsing cycles for each tray cart to provide automatic operation as in a dishwasher. Thus, the only manual operations are to place a tray cart on the wash chamber, start the wash-rinse program of automatic operation and then remove the tray cart at the end of the rinse cycle. Foot pedal 35 actuates clamp bar 22, leaving both hands free to manipulate the carts in an expeditious manner.

Having now described my invention and in what manner the same may be used, what I claim as new and desire to protect by Letters Patent is:

1. A tray cart washer comprising a wash chamber having a pair of side walls defining an inclined open top sloping down substantially to floor level on the front side of said chamber, wash and rinse nozzles in said chamber directed toward said open top, means to support a tilted tray cart in inclined position on said open top of said chamber with the inside of said cart exposed to sprays from said nozzles, and means to clamp the top of the cart against said chamber.

2. A tray cart washer as defined in claim 1, said clamp means comprising a movable clamp bar, and a foot pedal for retracting said clamp bar out of clamping position.

3. A tray cart washer as defined in claim 2 including a vertically slidable back plate closing the back side of said chamber, said clamp bar being connected with the upper end of said back plate.

4. A tray cart washer as defined in claim 1 for carts having hinged doors, said means to support a tray cart comprising a support bar on one of said side walls for one side of said cart, a support bar on the opposite side wall for the swinging edge of the cart door, and a central support bar arranged to underlie the door hinge.

5. A tray cart washer as defined in claim 1 for carts supported on wheels which elevate the bottom of the cart above floor level, said chamber including a low front wall, and support brackets on said front wall below the level of the bottom of the cart permitting the front of the cart to be wheeled over said brackets so that the cart may be tilted on said brackets to said inclined position for washing.

6. A tray cart washer as defined in claim 1, said wash and rinse nozzles being rotatable in inclined planes parallel with said inclined open top of said chamber.

7. A tray cart washer as defined in claim 1 including removable strainer trays in the bottom of said chamber, and a sump under said trays.

8. A tray cart washer as defined in claim 1 including means for rotating said nozzles adjacent said open top of said wash chamber, brackets on the front of said chamber engageable with the bottom of the cart for pivoting the cart to said inclined position, and foot lever operated means for clamping the top of the cart in said inclined position.

* * * * *